Feb. 7, 1939.    V. A. McCULLOUGH    2,146,024
PROCESS OF MAKING ACTIVATED CARBON
Filed Oct. 21, 1937    2 Sheets-Sheet 1

RATIO OF 4 PARTS OF ZINC CHLORIDE
TO ONE PART OF PINE SAWDUST-8 MESH.
ACTIVATED AT 560°C. FOR 0 HOURS.

VERNER A. McCULLOUGH
INVENTOR

BY
ATTORNEY

Feb. 7, 1939. V. A. McCULLOUGH 2,146,024
PROCESS OF MAKING ACTIVATED CARBON
Filed Oct. 21, 1937 2 Sheets-Sheet 2

$$Q = \frac{-\text{LOG } T\lambda}{-\text{LOG } T\lambda = 560}$$

VERNER A. McCULLOUGH
INVENTOR

BY
ATTORNEY

Patented Feb. 7, 1939

2,146,024

UNITED STATES PATENT OFFICE 2,146,024

PROCESS OF MAKING ACTIVATED CARBON

Verner A. McCullough, Wilmington, Del., assignor to Darco Corporation, Wilmington, Del., a corporation of Delaware Application October 21, 1937, Serial No. 170,164

4 Claims. (Cl. 252—3)

This invention relates to activated carbon and to the process of making the same. More particularly, it relates to the manufacture of activated carbon by heating cellulosic materials in the presence of phosphoric acid and zinc chloride to an activating temperature.

In the copending application of George H. Scheffler, Serial No. 115,103, filed Dec. 10, 1936, there is described the production of activated carbon of extremely high decolorizing activity from comminuted wood by the use of a ratio of zinc chloride to comminuted wood varying from 3.5 to 1 up to 6 to 1 and by activation at a temperature of substantially from 500 to 600° C. for a period of time not substantially exceeding one hour.

This invention relates to an activated carbon having an even greater decolorizing activity than activated carbon produced in accordance with the principles of said application Serial No. 115,103. The production of such a carbon is therefore the primary object of this invention.

Another object of this invention is the production of activated carbon having a much greater decolorizing power than activated carbon heretofore produced or heretofore commercially available.

Still another object of the invention is the provision of a new process for the production of such activated carbon in an economical and practicable manner.

Other objects of this invention will appear as this description proceeds.

In the accompanying drawings:—

Figure 1:
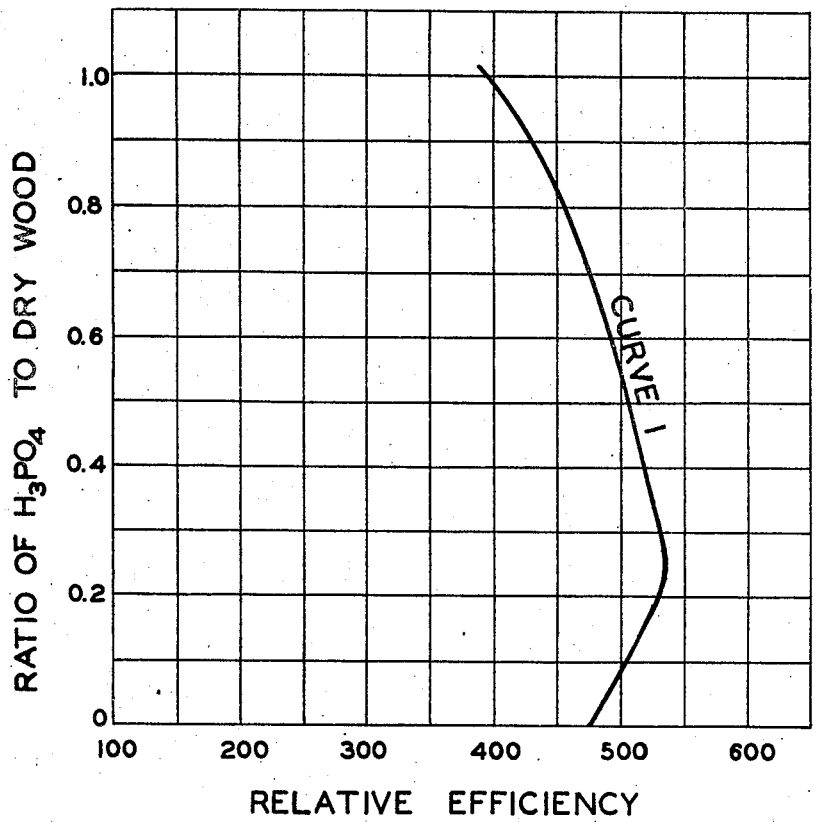

Fig. 1 is a graph portraying the effect of varying the ratio of phosphoric acid to wood, while holding the ratio of zinc chloride to wood constant at 4 to 1. This graph is more fully explained below.

Figure 2:
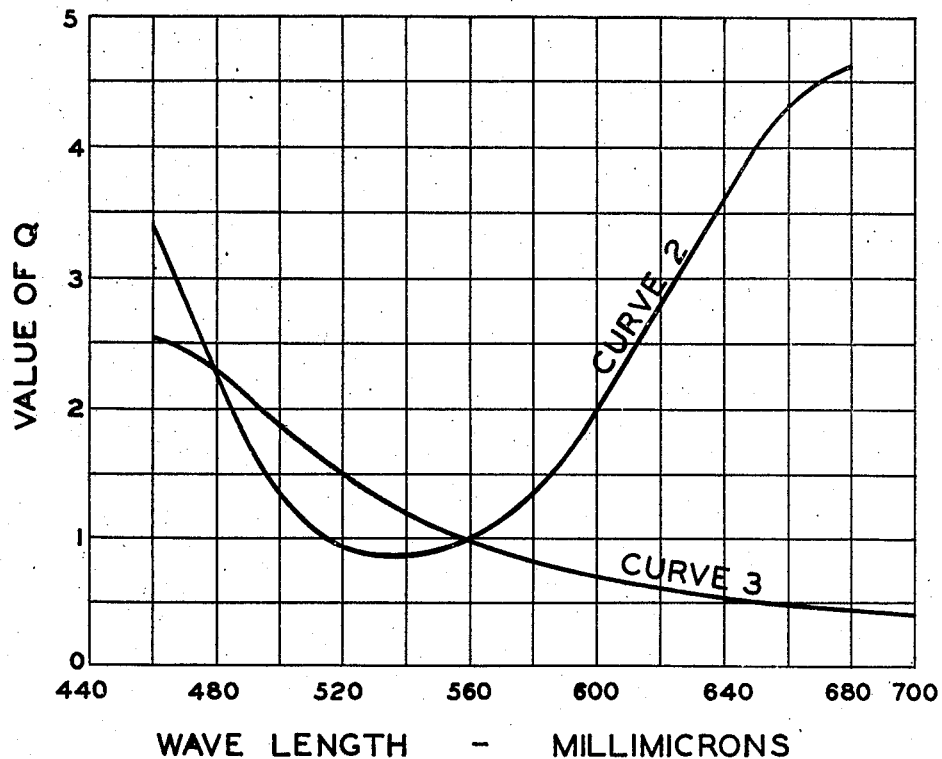

Fig. 2 is a graph having two curves, one of which defines the color transmitting characteristics of the molasses used in determining the relative decolorizing efficiency of the activated carbon and the other of which defines the color transmitting characteristics of the green color screen used for producing the beam of green light employed in determining the relative decolorizing efficiency of the activated carbon.

I have discovered that the use in the chemical activation of cellulosic material of phosphoric acid ($H_3PO_4$) in conjunction with zinc chloride produces a more highly active decolorizing carbon than the use of zinc chloride alone.

In carrying the invention into practice, I admix a suitable cellulosic material, such as wood sawdust, with an aqueous solution of phosphoric acid and zinc chloride in suitable proportions fully set forth below, and preferably digest the mixture at a relatively low temperature, following this digestion by activation at a temperature of 400 to 700° C., and preferably from 500 to 600° C. I thus obtain a product which, when washed to remove the chemicals therefrom, constitutes a highly active decolorizing carbon.

In the practice of the invention I use a ratio of zinc chloride to cellulosic material of from 2½ parts of zinc chloride to 1 part of dry cellulosic material up to 10 parts of zinc chloride to 1 part of dry cellulosic material, preferring to use the optimum ratio which lies between 3.5 to 1 and 6 to 1, and is usually about 4 to 1.

The zinc chloride is dissolved in sufficient water to form a 10 to 50% solution by weight. Phosphoric acid is then added with agitation. At the beginning of the addition of phosphoric acid, a white precipitate forms, which may be the normal zinc salt $Zn_3(PO_4)_2$ but this is not certain and it is not desired to be limited to this or any other theory. As the addition continues, this precipitate begins to go into solution and finally a point is reached where all of the precipitate just dissolves. It is preferred to add such an amount of phosphoric acid as will just cause the white precipitate formed to completely dissolve, since the carbon produced by the use of the solution so obtained has the greatest decolorizing activity and the highest relative efficiency. The amount of phosphoric acid required to thus dissolve this white precipitate generally is between one-fifteenth and one-eighteenth of the amount of zinc chloride. If phosphoric acid in amount substantially more or less than that required to dissolve this precipitate is used, a carbon of less activity is produced. However, carbons prepared by using more or less than this optimum amount have a considerably greater activity than those prepared by using zinc chloride alone, and therefore the use of such larger or smaller amounts is within the contemplation of the invention.

Cellulosic material, such as sawdust, peat, wood waste, or the like is then admixed with the solution thus obtained in such amounts that the ratio of dry zinc chloride to dry cellulosic material lies between 2½ to 1 and 10 to 1, and preferably is at the optimum set forth above. The mixture is agitated in order to obtain homogeneity and is then digested by heating to the boiling point for from one to five hours, followed by evaporation to substantial dryness, whereupon a black, pasty, plastic mass is obtained.

The digestion just referred to is susceptible of many variations but in general contemplates maintenance of the mixture at an elevated temperature of around 100° C. or higher up to the boiling point of the solution, followed by slow evaporation to substantial dryness. One method is to evaporate the mixture slowly, say over a period of two to three hours at or around the boiling point of the solution until the mixture reaches substantial dryness. Another method is to maintain the mixture at about the boiling point for one hour with replacement of evaporated water, following this by evaporation to dryness. If desired, the digestion may comprise heating at a temperature of 85-100° C. for three or four hours, followed by evaporation of the mixture to dryness. This latter expedient enables the utilization of waste steam in the initial part of the digestion.

The final temperature attained when evaporating the above mixture to dryness in the latter part of the digestion will usually be between 140° C. and 200° C., although this temperature may vary with varying conditions.

The temperature of boiling of the solution of zinc chloride and phosphoric acid will vary upwards from 100° C., depending upon the concentration of the solution, as will be obvious to those skilled in the art. Consequently, the boiling point will continually rise as the evaporation continues and the solution in the mixture becomes more concentrated.

The digestion accomplishes a thorough impregnation of the wood or similar cellulosic material with the solution of zinc chloride and phosphoric acid and causes dehydration and pre-carbonization of the wood, forming a mixture which is ready for activation.

After digestion of the cellulosic material in the manner just described, the black, tarry, plastic mass obtained is transferred into an activating furnace of any suitable type, preferably one which is closed to the atmosphere, and subjected to a temperature of from 400° to 700° C., and preferably from 500 to 600° C. It may be brought gradually, say over a period of twenty minutes to one hour, to this temperature and removed immediately upon reaching the same, or it may be brought to this temperature fairly rapidly and maintained at this temperature for a period of time which may vary up to one-half to one hour or even longer. The latter method produces activated carbon of considerably higher decolorizing activity than the former. In general, the longer the period of time during which the mass is maintained at the activating temperature, the greater the decolorizing activity of the carbon obtained. However, the increase in decolorizing activity with periods in excess of one hour is generally not sufficiently great to warrant the increased expense of the longer period of time. It is highly preferred to calcine the mass at a temperature of 500° C. for a period of one hour since this produces a carbon having optimum decolorizing power at minimum expense.

At the end of the period of activation, the contents of the furnace are discharged and allowed to cool in any desired manner, as by dumping the hot mass into cold water. After cooling, the carbon is washed thoroughly with dilute hydrochloric acid and with water so as to remove all traces of chemicals therefrom, and is then dried, ground to desired size, and packed for shipment.

In Fig. 1 of the drawings, curve I shows how the relative efficiency at 90% decolorization varies with the ratio of phosphoric acid to dry pine sawdust while holding the ratio of zinc chloride to sawdust constant at 4 to 1. The procedure followed in the preparation of the carbons of which the curve is representative was as follows:—

The zinc chloride was mixed with water to form a 25% solution and to this was added phosphoric acid in the ratios indicated. Sawdust was admixed with the resulting solution and digested by slow evaporation over a period of two to three hours to a black, pasty mass, and the digestion followed by activation at 560° C. for 0 hour.

It will be seen from curve I of Fig. 1 that the ratio of phosphoric acid to dry wood of 0.23-1 (0.23 gm. of 100% $H_3PO_4$ per gm. of dry wood) produced the maximum relative efficiency of 535. This ratio corresponds to the point where the precipitate formed is completely soluble. An increase in the phosphoric acid concentration above this point or a decrease in this concentration below this point produces a decrease in the decolorizing activity of the carbon.

It is to be understood that this curve, although indicative of the relative efficiency obtained by using phosphoric acid in combination with zinc chloride in the chemical activation of cellulosic material, is shown merely for the purpose of illustrating the invention, and is not to be taken in any way as limiting the scope of the invention since by varying the conditions of activation, results may be obtained which do not coincide with the graph of Fig. 1 of the drawings but which are similar in that the relative efficiency increases with addition of phosphoric acid until the point where the precipitate formed just dissolves and then decreases with further addition until finally a point is reached where the relative efficiency is lower than that with zinc chloride alone.

Below I have given several specific examples of various modes of carrying the invention into practice. These examples, while representing the preferred practice of the invention, are not to be construed as limiting, however, except as the invention is defined in the appended claims.

*Example 1*

This example involves the use of a ratio of zinc chloride to wood of 4 to 1 and a ratio of phosphoric acid to wood of 0.25 to 1, and carbonization at 500° C. for one hour.

One hundred grams of anhydrous zinc chloride were added to 300 grams of water and the mixture agitated until a clear solution was obtained. This solution contained 25% by weight of anhydrous zinc chloride, and weighed 400 grams. 85% phosphoric acid was added with stirring until the white precipitate formed initially was just completely dissolved. The amount required contained 6.25 grams of 100% $H_3PO_4$. 25 grams of pine sawdust, on a dry basis, screened so as to pass through an 8-mesh screen, were added to the clear solution thus obtained. The mixture was slowly evaporated over a period of two or three hours to a black, pasty mass. The final temperature of digestion was about 180° C. The digested mass was then activated by heating at 500° C. for one hour. The activated carbon thus obtained had a relative efficiency of 600 at 90% decolorization.

*Example 2*

This example involved the use of a ratio of zinc chloride to wood of 4 to 1 and a ratio of phosphoric acid to wood of 0.23 to 1 and carbonization at 560° C. for 0 hour.

One hundred grams of anhydrous zinc chloride were added to 300 grams of water and the mixture agitated until a clear solution was obtained. This solution contained 25% by weight of anhydrous zinc chloride, and weighed 400 grams. 85% phosphoric acid was added with stirring until the white precipitate formed initially was just completely dissolved. The amount utilized contained 5.75 grams of 100% $H_3PO_4$. 25 grams of pine sawdust, on a dry basis, screened so as to pass through an 8-mesh screen, were added to the clear solution thus obtained. The mixture was slowly evaporated over a period of two to three hours to a black, pasty mass. The final temperature of digestion was about 180° C. The digested mass was then brought to a temperature of 560° C. over a period of 35 to 45 minutes and was immediately discharged from the furnace. The activated carbon thus obtained had a relative efficiency of 535 at 90% decolorization.

*Example 3*

This example involves the use of a ratio of zinc chloride to wood of 3 to 1 and a ratio of phosphoric acid to wood of 0.18 to 1 and involves activation under the same conditions as Example 1.

Seventy-five grams of anhydrous zinc chloride were added to 225 grams of water and the mixture agitated until a clear solution was obtained. This solution contained 25% by weight of anhydrous zinc chloride, and weighed 300 grams. 85% phosphoric acid was added with stirring until the white precipitate formed initially was completely dissolved. The amount required contained 4.5 grams of 100% $H_3PO_4$. 25 grams of pine sawdust, on a dry basis, screened so as to pass an 8-mesh screen, were added and the resulting mixture was slowly evaporated to substantial dryness (i. e. to a black, pasty mass). The final temperature of digestion was 140° C. The digested mass was then activated by heating at 500° C. for one hour. The activated carbon thus obtained had a relative efficiency of 410 at 90% decolorization.

*Example 4*

This example involves the use of a ratio of zinc chloride to wood of 5 to 1 and a ratio of phosphoric acid to wood of about 0.29 to 1.

125 grams of anhydrous zinc chloride were added to 300 grams of water and the mixture was agitated until a clear solution was obtained. 85% phosphoric acid was added with stirring until the white precipitate initially formed was just completely dissolved. The amount required contained 7.22 grams of 100% $H_3PO_4$. 25 grams of pine sawdust, on a dry basis, screened so as to pass an 8-mesh screen, were added to the clear solution thus obtained. The mixture was slowly evaporated over a period of two to three hours to a black, pasty mass. The digested mass was then brought to 550° C. in 30 to 45 minutes and immediately removed. The product had a relative efficiency of 570 at 90% decolorization.

*Example 5*

This example involves the use of a ratio of zinc chloride to wood of 6 to 1 and a ratio of phosphoric acid to wood of about 0.36 to 1.

150 grams of anhydrous zinc chloride were added to 300 grams of water and the mixture was agitated until a clear solution was obtained. 85% phosphoric acid was added to this solution with stirring until the white precipitate initially formed was just completely dissolved. The amount required contained 9.1 grams of 100% $H_3PO_4$. 25 grams of pine sawdust, on a dry basis, screened so as to pass an 8-mesh screen, were added to the clear solution thus obtained. The mixture was slowly evaporated over a period of two to three hours to a black, pasty mass. The digested mass was then brought to 550° C. in 30 to 45 minutes and immediately removed. The product had a relative efficiency of 570 at 90% decolorization.

In each of the above examples the activation was followed by dumping the mass into cold water and washing by boiling with dilute hydrochloric acid, and then washing with water. The wet carbon was then dried and ground to the desired fineness.

The term "relative efficiency" employed throughout this specification is commonly used in the arts of the manufacture of and use of decolorizing activated carbon to designate the decolorizing ability of a given carbon as compared with that of a carbon known as a "standard" carbon. In order to define the term "relative efficiency" it is necessary to set forth the method of testing the carbon to ascertain its activity. This method is the so-called "black molasses" test and is in commercial use by many manufacturers and users of activated carbon. It is as follows:—

An aqueous solution of a black strap molasses is prepared of such a concentration (18 grams per liter) that a 10 millimeter thickness of it transmits 25% of a beam of green light (more fully described below) directed through the solution. The black strap molasses had the following composition:

| | |
|---|---|
| Sucrose | 34.11 |
| Invert sugar | 19.65 |
| Total sugars | 53.76 |
| Mineral matter | 9.62 |
| Proteins | 5.38 |
| Cane gums | 1.45 |
| Water | 23.47 |
| Organic matter (undetermined) | 6.32 |
| | 100.00 |

The green color screen used for forming the beam of green light referred to had a Q curve as indicated by curve 2 (Fig. 2) of the accompanying drawings. The color of the molasses solution used in this test is defined by a Q curve which is curve 3 (Fig. 2) in the accompanying drawings. The molasses solution formed as above will transmit 25% of a beam of green light formed by the color screen having a Q curve as given in curve 2. In Fig. 2, Q is equal to the negative logarithm of the transmission of light at any given wave length divided by the negative logarithm of the transmission of light of a wave length of 560 millimicrons, and the Q curves were obtained by plotting the Q values at varying wave lengths for the color screen and the molasses, respectively, against the wave length. The data for these curves were obtained using a Keuffel and Esser color analyzer.

Into six bottles are placed 150 milliliters of the solution prepared as above with 1 gram of "Filtercel" which is added to give a brilliant filtrate and which has no measurable adsorption effect. Three portions of the "standard" carbon, each of a different weight, and three portions of the carbon to be tested, also each of a different weight, are weighed out and placed in the bottles. The bottles are then capped and agitated for one hour and 10 minutes at 90–95° C. They are then allowed to cool and are filtered twice. The transmission of green light by each sample is then read on an American Photoelectric Co. photoelectric colorimeter. The green color units removed per gram of carbon are then plotted against the green color units remaining in the solution, giving straight line adsorption isotherms for both the "standard" carbon and the carbon being tested. A vertical line is drawn through the isotherms at the point at which 90% of the color is removed and the efficiency of the test carbon compared with that of the "standard" carbon. Thus, if it takes four times as much of the standard carbon as it does of the test carbon to remove 90% of the green color units of the original molasses solution, the test carbon is said to have "a relative efficiency" of 400% or 400.

The green color units are equal to $162.5 (2-\log_{10}T)$ where T equals the percentage of transmission of green light (Chem. and Met., 28, 541 (1923)). The decolorization obeys Freundlich's adsorption equation—

$$\frac{Co-C}{M}=KC^{1/n} \qquad (1)$$

Where:
$Co$ = the green color units in the original solution,
$C$ = the green color units in the decolorized solution at equilibrium,
$Co-C$ = the green color units removed
$M$ = the weight of carbon
$\frac{Co-C}{M}$ = the green color units removed per gram of carbon, and
$K$ and $1/n$ are empirical constants.
Therefore—

$$\log \frac{Co-C}{M}=\log K+1/n \log C \qquad (2)$$

The plot of the values of $$\frac{Co-C}{M}$$

against $C$ on double logarithmic paper should therefore give a straight line, from which the values of $K$ and $1/n$ may be determined if desired since $K$ is the value of $$\frac{Co-C}{M}$$

where $C=1$ and since $1/n$ is the slope of the isotherm.

In this test, by "standard carbon" is meant a carbon of which 1 gram will remove 90% of the green color units from 150 milliliters of the molasses solution described above. An example of a commercial carbon now available having such decolorizing properties is Darco S—51 which has a relative efficiency therefore of 100. Measured by this test, the commercial carbon Darco G—60 has a relative efficiency of about 200. Another example of such standard carbon is that produced by the following procedure:—

30 grams, on a dry basis, of pine sawdust passing an 8-mesh screen, were added to 60 grams of zinc chloride. Enough water was added to make the concentration of zinc chloride approximately 25%. The mixture was then evaporated to dryness over a free flame to a temperature of 220° C., the evaporation taking about 3 hours. The digested mass was then carbonized at 400° C. for one hour. The carbon was then dumped into cold water and washed by boiling with dilute hydrochloric acid and then with water.

In this specification, by the term "decolorizing carbon" I refer to an activated carbon which is especially adapted for use in decolorizing liquids and in the removal of objectionable tastes and odors from liquids. Thus, the decolorizing carbons of this invention are preeminently suited for use in the decolorizing of impure sugar solutions and syrups and in the refining of organic or inorganic materials whether in solution or in the molten or undissolved state, in the purification of used dry-cleaning solvents, in the purification of oils, fats, waxes and the like.

It will be apparent from the foregoing description that I have devised a novel method of preparing activated carbon which has superior decolorizing ability. It will be understood that while the preferred mode of procedure has been set forth in detail, this is only to apprise skilled workers in the art how to practice the invention and is not to be taken as limiting the invention, which is to be limited only as defined in the appended claims.

Having described my invention, what I claim is:

1. A process of producing activated carbon which comprises subjecting a mixture of cellulosic material, phosphoric acid and zinc chloride to calcination at a temperature of from 400 to 700° C., the proportion of zinc chloride in said mixture being such as to yield a ratio of dry zinc chloride to dry cellulosic material of substantially from 3 to 1 up to 6 to 1, and the proportion of phosphoric acid in said mixture being substantially between one-fortieth and one-tenth of the amount of zinc chloride.

2. A process of producing activated carbon which comprises subjecting a mixture of cellulosic material, phosphoric acid and zinc chloride to calcination at a temperature of from 400 to 700° C., the proportion of zinc chloride in said mixture being such as to yield a ratio of dry zinc chloride to dry cellulosic material of substantially from 3 to 1 up to 6 to 1, and the proportion of phosphoric acid in said mixture being substantially between one-eighteenth and one-fifteenth of the amount of zinc chloride.

3. A process of producing activated carbon which comprises admixing cellulosic material with an aqueous solution of phosphoric acid and zinc chloride, the amount of zinc chloride employed being such as to yield a ratio of dry zinc chloride to dry cellulosic material of substantially from 3 to 1 up to 6 to 1, and the amount of phosphoric acid employed being substantially between one-fortieth and one-tenth of the amount of zinc chloride, impregnating the cellulosic material by maintaining the mixture at a temperature approximating the boiling point of said solution and evaporating it to substantial dryness, and subjecting the impregnated residue to calcination at a temperature of from 400 to 700° C.

4. A process of producing activated carbon which comprises admixing cellulosic material with an aqueous solution of phosphoric acid and zinc chloride, the amount of zinc chloride employed being such as to yield a ratio of dry zinc chloride to dry cellulosic material of substantially from 3 to 1 up to 6 to 1, and the amount of phosphoric acid employed being substantially between one-eighteenth and one-fifteenth of the amount of zinc chloride, impregnating the cellulosic material by maintaining the mixture at a temperature approximating the boiling point of said solution and evaporating it to substantial dryness, and subjecting the impregnated residue to calcination at a temperature of from 400 to 700° C.

VERNER A. McCULLOUGH.